United States Patent
Aldrey et al.

(10) Patent No.: US 8,108,458 B2
(45) Date of Patent: Jan. 31, 2012

(54) SYSTEMS AND METHODS FOR PROVIDING ENHANCED SHIPPING AND RECEIVING SERVICES

(75) Inventors: Raul Aldrey, Dallas, TX (US); Diego Crespo, Boston, MA (US); Anil Guntupalli, Waltham, MA (US); Sudhanshu Sharma, Malden, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 479 days.

(21) Appl. No.: 11/606,202

(22) Filed: Nov. 30, 2006

(65) Prior Publication Data

US 2008/0133659 A1 Jun. 5, 2008

(51) Int. Cl.
*G06F 15/16* (2006.01)

(52) U.S. Cl. ......... 709/203; 709/201; 709/202; 705/26; 705/401

(58) Field of Classification Search .................. 709/217, 709/218, 201–203
See application file for complete search history.

(56) References Cited

U.S. PATENT DOCUMENTS

| | | | |
|---|---|---|---|
| 6,772,130 B1 * | 8/2004 | Karbowski et al. ............. | 705/26 |
| 6,976,007 B1 * | 12/2005 | Boucher et al. ................. | 705/28 |
| 7,299,125 B2 * | 11/2007 | Marks et al. ................... | 701/201 |
| 7,428,502 B2 * | 9/2008 | Horton ........................ | 705/26.35 |
| 2002/0081178 A1 * | 6/2002 | Shimada ....................... | 414/333 |
| 2002/0130065 A1 * | 9/2002 | Bloom .......................... | 209/630 |
| 2002/0178074 A1 * | 11/2002 | Bloom .......................... | 705/26 |
| 2003/0144971 A1 * | 7/2003 | Das et al. ..................... | 705/401 |
| 2003/0163536 A1 * | 8/2003 | Pettine, Jr. ................... | 709/206 |
| 2003/0236688 A1 * | 12/2003 | Kadaba et al. ................. | 705/6 |
| 2004/0215588 A1 * | 10/2004 | Cornelius ...................... | 707/1 |
| 2005/0038758 A1 * | 2/2005 | Hilbush et al. ................ | 705/402 |
| 2005/0140511 A1 * | 6/2005 | Bonnell et al. ................ | 340/572.7 |
| 2005/0234641 A1 * | 10/2005 | Marks et al. .................. | 701/213 |
| 2005/0251330 A1 * | 11/2005 | Waterhouse et al. .......... | 701/204 |
| 2006/0020366 A1 * | 1/2006 | Bloom .......................... | 700/226 |
| 2006/0129691 A1 * | 6/2006 | Coffee et al. ................. | 709/230 |
| 2006/0145837 A1 * | 7/2006 | Horton et al. ............ | 340/539.13 |
| 2006/0229895 A1 * | 10/2006 | Kodger, Jr. .................... | 705/1 |
| 2008/0133261 A1 * | 6/2008 | Ray ............................... | 705/1 |

* cited by examiner

*Primary Examiner* — Wing Chan
*Assistant Examiner* — Razu Miah

(57) ABSTRACT

A method includes receiving, from a sender, a contact selection related to a shipping request, identifying package shipping data associated with the selected contact, and providing the shipping request, including the package shipping data, to a shipping provider. The method further includes receiving a package identifier related to the shipping request from the shipping provider and associating the package identifier to a sender identifier related to the sender and a contact identifier related to the selected contact.

12 Claims, 13 Drawing Sheets

SYSTEMS AND METHODS FOR PROVIDING ENHANCED SHIPPING AND RECEIVING SERVICES

BACKGROUND INFORMATION

Shipping and receiving of packages is a common activity among consumers and businesses today. Activities related to shipping and receiving generally involve providing information associated with the package (e.g., recipient, address, etc.), providing a package to a shipping provider (e.g., drop off, pickup, etc.), assignment of a tracking number, and delivery of the package to the recipient.

A shipping provider may provide a sender with means for providing and receiving information about packages electronically. Such means may include, for example, electronic or web interfaces and/or paper forms that are completed with particulars for the packages. These particulars may include a recipient's address, recipient's telephone number, sender's address, sender's phone number, and other information useful to identify the package and ensure safe delivery. Providing such information may require a sender to key and/or write in a large amount of data. This data must be maintained by the sender (e.g., on paper, database, or other suitable means). The sender may then provide the packages to a shipping provider (e.g., UPS™, FedEx®, DHL, etc.), or a company affiliated with the shipping provider (e.g., Mailboxes etc.) or schedule a pickup for the packages.

Upon shipping the packages, a sender may receive a tracking number assigned to each package sent. This tracking number may enable a sender or receiver to check the status of packages by entering or otherwise providing the number to a provided interface. Shipping providers may scan or otherwise enter information related to package status at a predetermined interval and link such information to a number unique within a tracking system. For example, a shipping provider may scan a tracking number bar code as a package enters various waypoints (e.g., a depot in Kansas, a receiving facility in recipient's hometown, etc.) on its journey to a recipient. Each time the bar code is scanned, information such as package location and timestamp may be recorded and linked to the package tracking number. Therefore, a receiver wishing to determine an anticipated delivery date for one or more packages may go to a web site and enter each tracking number related to each package to be checked. The shipping provider may then provide information including, for example, current location, anticipated delivery date, and shipping date of each package for which a tracking number was entered based on saved tracking information. In some situations, a sender may or may not provide the tracking number to a recipient, and the recipient may, therefore, have no means for determining status of a package or multiple packages without contacting the sender. Further, due to uniqueness and other factors, tracking numbers often comprise long and unrelated strings of characters, and are therefore cumbersome to communicate and difficult to remember.

Once a package arrives at its destination (e.g., a home, a receiving department, etc.) it may be received immediately (as in a home delivery), or as is more often the case, left to sit for several hours or days until processed and delivered to the actual recipient. While a recipient may check package status using the tracking number (if provided by the sender), the recipient must be proactive in checking such status, possibly checking status on numerous occasions throughout the day. This may be inconvenient, especially where the recipient is awaiting an important package. Further, the status may only reveal that the package has been delivered, requiring an additional phone call to the receiving department or other facility.

Because each shipping provider may have different data requirements, interfaces, package handling methods, etc., senders and receivers may be required to become familiar with the varying systems. Further, information exchange (e.g., package information transfer, package tracking, etc.) has generally been limited to a web interface and/or a physical ("bricks and mortar") place of business. This may be inconvenient for many senders and receivers who cannot spare the time to sit down at a computer or stop into a shipping provider location to inquire about package status, among other things. Moreover, current systems are limited in the functions provided to a user. Some of the functions include calculating shipping charges, creating shipping labels, scheduling a pickup time and location, tracking package progress and receiving delivery notification. However, a more dynamic system may provide more flexibility and many more useful functions to the user.

DETAILED DESCRIPTION OF THE PREFERRED EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the disclosure. The following detailed description does not limit the disclosure. Instead, the scope of the disclosure is defined by the appended claims and their equivalents.

Methods and systems consistent with certain embodiments of the present disclosure provide enhanced package shipping and receiving services and enable users to easily access information related to one or more packages. In addition, senders and receivers may be dynamically notified as to package status updates as desired. Additional details of such functionality are described below in connection with FIGS. 7-13. Interface methods may include one or more of a home telephone, a business telephone, a cell phone, a PDA, a personal computer (e.g., PC, Mac, etc.), etc. Informational messages may include text, voice, data, file attachments, invitations, etc. Methods and systems consistent with certain embodiments may also include functionality for automatically establishing conference sessions among senders and receivers upon package status updates.

Figure 1:
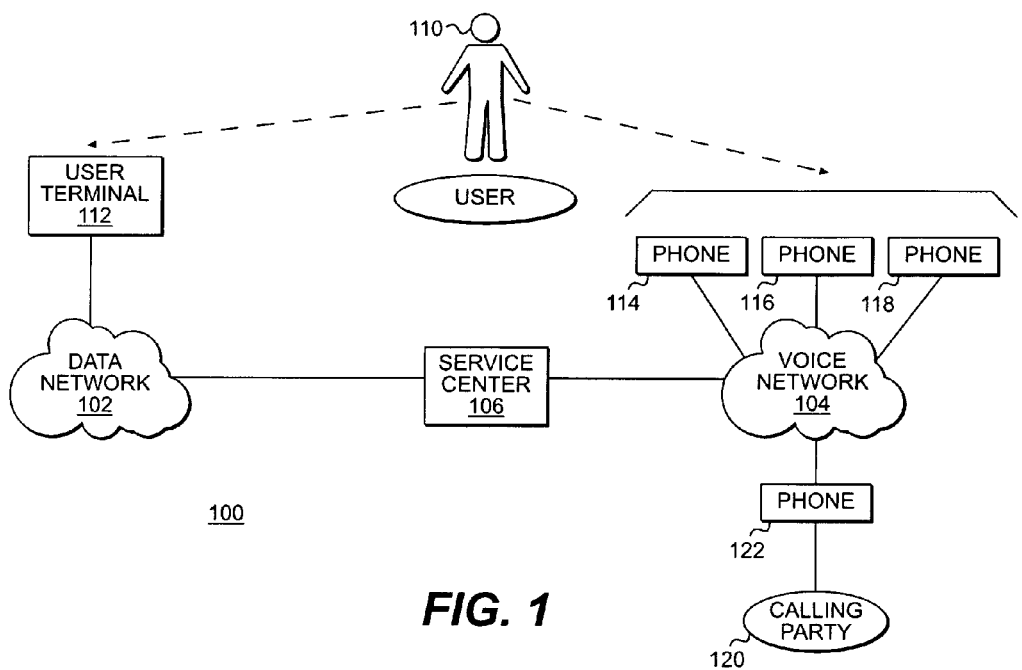
FIG. 1 is a diagram of an exemplary data processing and telecommunications environment.

FIG. 1 is a block diagram of a data processing and telecommunications environment 100, in which features and aspects consistent with the present disclosure may be implemented. The number of components in environment 100 is not limited to what is shown and other variations in the number of arrangements of components are possible, consistent with embodiments of the disclosure. Certain components of FIG. 1 may be implemented through hardware, software, firmware, and/or any combination of these structures. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use phone 122 to call a user, such as user 110, at any one of phones 114, 116, and 118.

Data network 102 may provide communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. Although FIG. 1 shows a single data network 102, one will appreciate that network 102 is only representative in nature and in some implementations may consist of more than one network configuration designed to communicate using various wireless and wireline structures and various protocols. By way of example, data network 102 may be implemented through a wide area network ("WAN"), local area network ("LAN"), an intranet, and/or the Internet. Further, the service center 106 may be connected to multiple data networks 102, such as, for example, a wireless carrier network and the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using Voice-over Internet Protocol ("VoIP") technology. In addition, voice network 104 may be implemented using both PSTN and VoIP technology. Further, service center 106 may be connected to multiple voice networks 104, such as, for example, Verizon's™ Voice Network, voice networks operated by other carriers, and wireless carrier networks. Although FIG. 1 shows a single voice network 104, one will appreciate that network 104 is only representative in nature and in some implementations may consist of more than one network configuration designed to communicate using various wireless and wireline structures and various protocols.

Service center 106 may provide a platform for managing communications over data network 102 and voice network 104. Service center 106 also provides gateway functions, such as code and protocol conversions, to transfer communications between data network 102 and voice network 104. Service center 106 may be implemented using a combination of hardware, software, firmware, and any combination of these structures. For example, service center 106 may be implemented using one or more general purpose computers or servers coupled by a network (not shown). Although service center 106 is shown with direct connections to data network 102 and voice network 104, any number and type of network elements may be interposed between service center 106, data network 102, and voice network 104.

User terminal 112 may provide user 110 with an interface to data network 102, among other things. For example, user terminal 112 may be implemented using any device capable of accessing the Internet, such as a general purpose computer or personal computer equipped with a modem. User terminal 112 may also be implemented in other devices, such as the RIM Blackberry, Sony Mylo, Ergo Audrey, and the like. Furthermore, user terminal 112 may be implemented in wireless devices, such as pagers, mobile phones (with data access functions), and Personal Digital Assistants ("PDA") including network connections.

User terminal 112 may also allow user 110 to communicate with service center 106. For example, user 110 may use instant messaging ("IM") to communicate with service center 106. In addition, user terminal 112 may use various protocols in transmitting and receiving messages, including, for example, the Transmission Control Protocol/Internet Protocol (TCP/IP), the hypertext transfer protocol ("HTTP"), the file transfer protocol ("FTP"); the hypertext markup language ("HTML"); and the extensible markup language ("XML"). Furthermore, a client application may be installed on user terminal 112 to communicate directly with service center 106. Also, user terminal 112 may communicate with service center 106 via a proxy.

Phones 114, 116, 118, and 122 may interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
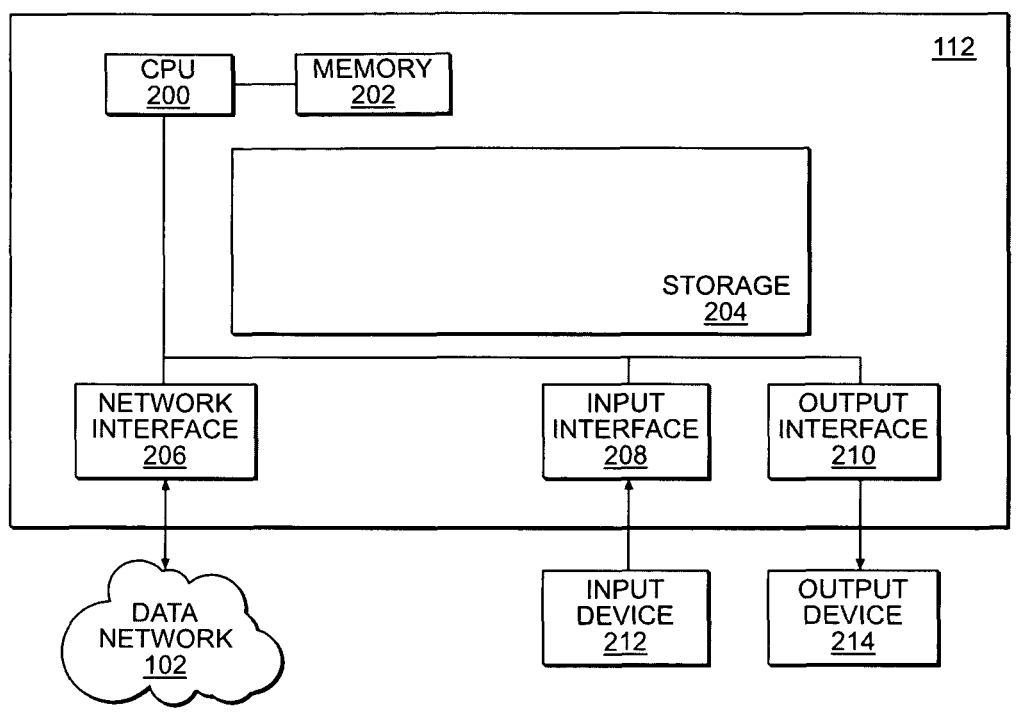
FIG. 2 is a high level block diagram of a user terminal.

FIG. 2 is a block diagram of a user terminal according to one exemplary embodiment. User terminal 112 may include a central processing unit ("CPU") 200, a memory 202, a storage module 204, a network interface 206, an input interface 208, an output interface 210, an input device 212, and an output device 214.

CPU 200 may provide control and processing functions for user terminal 112. Although FIG. 2 illustrates a single CPU, user terminal 112 may include multiple CPUs. CPU 200 may also include, for example, one or more of the following: a coprocessor, memory, registers, and other processing devices and systems as appropriate. CPU 200 may be implemented, for example, using a Pentium processor provided by Intel Corporation.

Memory 202 may provide a memory for program code for CPU 200. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, a CD ROM drive, a DVD drive, a general-purpose storage device, a removable storage device, and/or other devices capable of storing information. Further, although storage module 204 is shown within user terminal 112, storage module 204 may be external to user terminal 112 yet connected to user terminal 112 using a variety of wired and wireless architectures such as USB, SCSI, etc.

Storage module 204 may include program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service ("MSNMS") client or Verizon iobi$^{SM}$ client; and an Operating System ("OS"), such as the Windows Operation System provided by Microsoft Corporation or Unix (e.g., Linux, Mac OS X, etc.). In addition, storage module 204 may include other program code and information, such as program code for TCP/IP communications; kernel and device drivers; configuration information, such as a Dynamic Host Configuration Protocol ("DHCP") configuration; a web browser, such as Internet Explorer provided by Microsoft Corporation; and any other software that may be installed on user terminal 112.

Network interface 206 may provide a communications interface between user terminal 112 and data network 102. Network interface 206 may receive and transmit communications for user terminal 112. For example, network interface 206 may be a modem or a LAN port.

Input interface 208 may receive input from user 110 via input device 212 and may provide the input to CPU 200. Input device 212 may include, for example, a keyboard, a microphone, and a mouse. Other types of input devices may also be implemented. Input interface 208 thus constitutes a point at which a user interacts with user terminal 112.

Output interface 210 may provide information to user 110 via output device 214. Output device 214 may include, for example, a display, a printer, and a speaker. Other types of output devices may also be implemented. Output interface 210 similarly constitutes a point at which a user interacts with user terminal 112.

Figure 3:
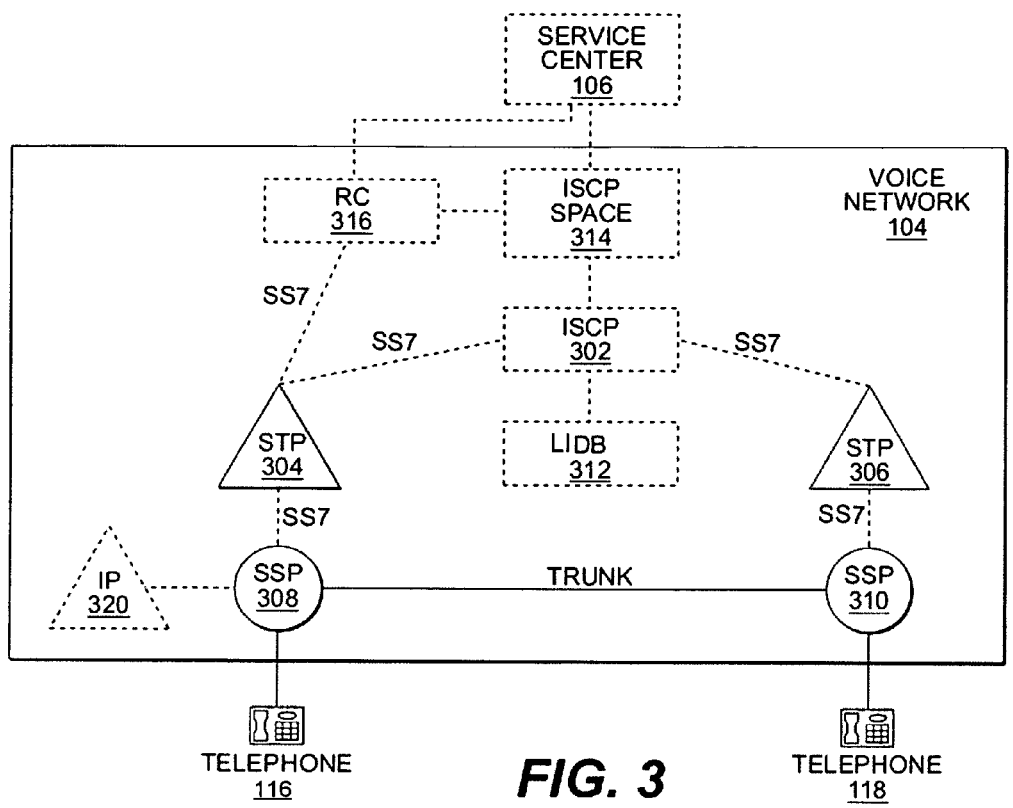
FIG. 3 is a high level diagram of a voice network.

FIG. 3 is a diagram of a preferred voice network. As shown, voice network 104 may include an intelligent service control point ("ISCP") 302, service transfer points ("STP") 304 and 306, service switching points ("SSP") 308 and 310, a line information database ("LIDB") 312, an ISCP Service Provisioning and Creation Environment ("SPACE") 314, a Recent Change Engine ("RCE") 316, and an Intelligent Peripheral ("IP") 320.

Voice network 104 may be implemented using the PSTN and SS7 as a signaling protocol. The SS7 protocol allows voice network 104 to provide features, such as call forwarding, caller ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point ("SCP") or an Advanced Intelligent Network ("AIN") SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 may relay SS7 messages within voice network 104. For example, STPs 304 and 306 may route SS7 messages between SSPs 308 and 310. STPs 304 and 306 may be implemented using known hardware and software from manufacturers such as NORTEL and LUCENT Technologies.

SSPs 308 and 310 may provide an interface between voice network 104 and phone 116 and phone 118, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 (at phone 118) and user 110 (at phone 116). For example, SSPs 308 and 310 may exchange SS7 messages, such as TCAP messages, within message signal units ("MSU") to control calls, perform database queries to LIDB 312, and provide maintenance information.

LIDB 312 may comprise one or more known databases to support the features of voice network 104. For example, LIDB 312 may include subscriber information, such as a service profile, name and address, and credit card validation information.

ISCP SPACE 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more RCEs 316 such as, for example, an Enterprise Recent Change engine (eRC); an Assignment, Activation, and Inventory System ("MIS"); or a multi-services platform ("MSP"). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an MIS is used for providing updates to ISCPs 302.

Additionally, voice network 104 may include one or more IPs. For example, in FIG. 3, an IP 320 is illustrated as being connected to SSP 308. These IPs may be used for providing services, such as voice mail services.

Figure 4:
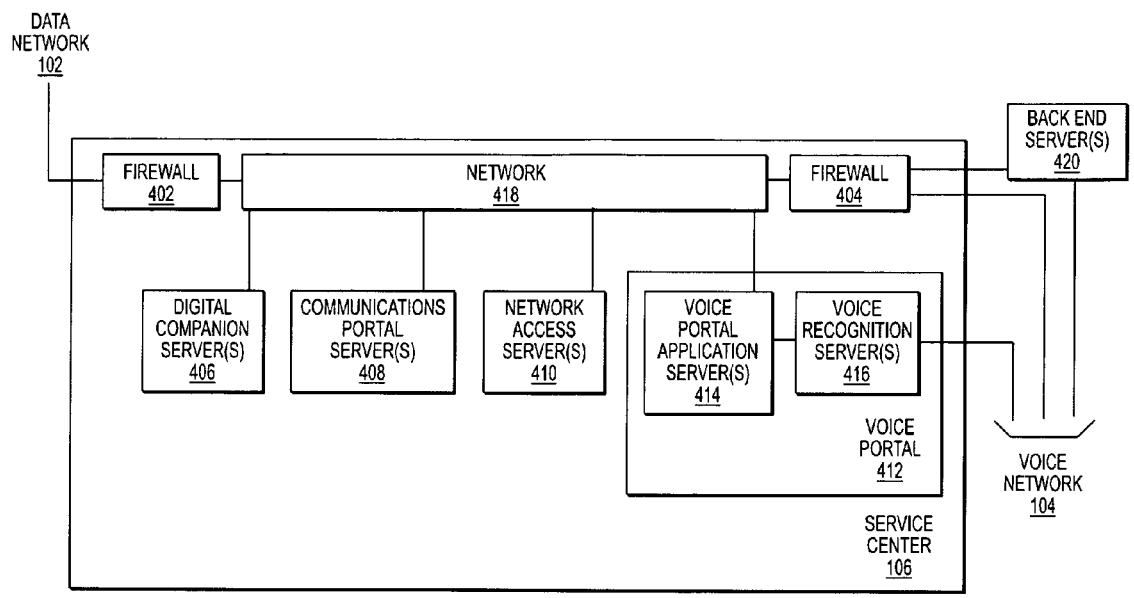
FIG. 4 is a high level block diagram of a service center.

FIG. 4 is a block diagram of a service center 106 according to one exemplary embodiment. As shown, service center 106 may include firewalls 402 and 404, one or more digital companion servers 406, one or more communication portal servers 408, one or more network access servers 410, and a voice portal 412. Voice portal 412 may include one or more voice portal application servers 414 and one or voice recognition servers 416. A network 418 may be used to interconnect the firewalls and servers. Additionally, one or more back end servers 420 may be provided between service center 106 and voice network 104.

Firewalls 402 and 404 may provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present disclosure. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or Fiber Distributed Data Interface ("FDDI") network. Additionally, network 418 may also include switches and routers as appropriate without departing from the scope of the disclosure. Further, additional firewalls may be present in network 418, for example, to place one or more of servers 406, 408, 410, or voice portal 412 behind additional firewalls.

Each server (406, 408, 410, 414, 416, and 420) may be any type of computer, such as a Unix or DOS-based computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center 106. Exemplary services include, for example, permitting a customer to add contacts to their address book from a history of calls made or received by the customer (e.g., utilizing caller ID services), permitting a customer to make calls directly from their address book, scheduling a package pickup/shipment, or permitting the customer to look at package status (e.g., shipped/received) as associated with a particular phone number. Additionally, these services may include permitting the customer to listen to their voice mail on-line, forwarding their calls based on a scheduler, receive notifications regarding package status, and/or calling a sending/receiving party's number, setting up conference sessions on-line, etc. Methods and systems of preferred embodiments may leverage digital companion server 406 to perform contact management services.

A communications portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 may include software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, voice recognition server(s) 416 and voice portal application server(s) 414. Voice recognition server(s) 416 may receive and interpret dictation, or recognize spoken commands. Application server(s) 414 may take, for example, the output from voice recognition server(s) 416, convert it to a format suitable for service center 106, and forward the information to one or more servers (406, 408, and 410) in service center 106.

Figure 5:
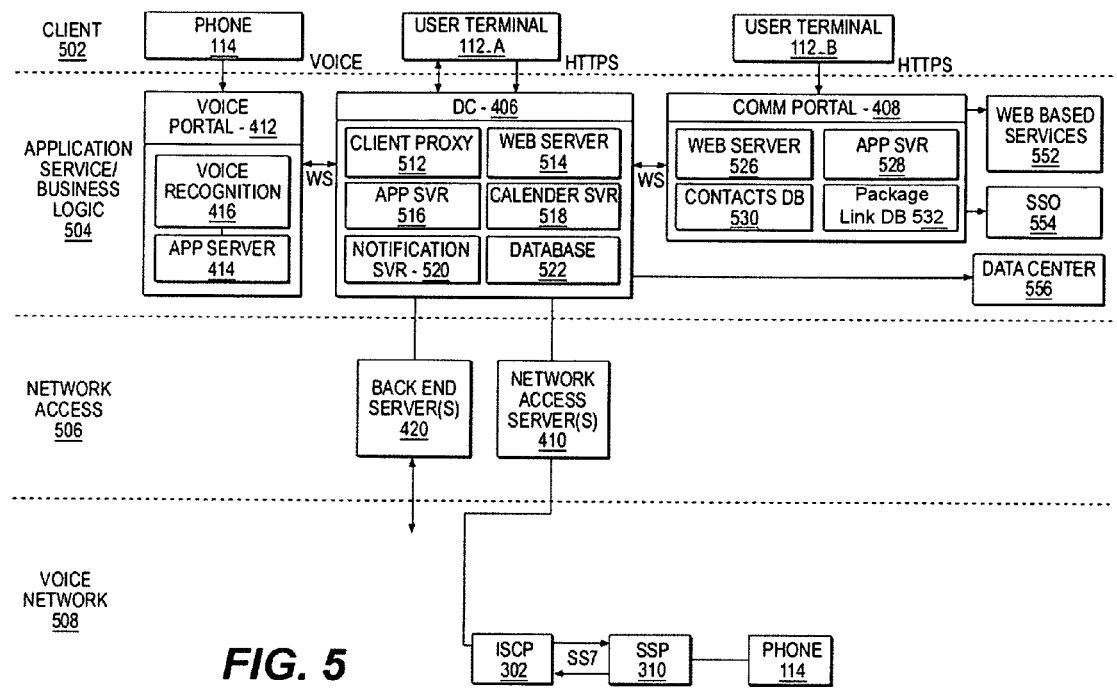
FIG. 5 illustrates a logical architecture of a system.

FIG. 5 illustrates a logical architecture of a system consistent with certain embodiments. As illustrated, the logical architecture may be split into four planes: client side plane 502, application service business logic plane 504, network access plane 506, and voice network plane 508.

Client side plane 502 may include the user terminals 112_A and 112_B that a user may use to send and/or receive information to/from the service center 106. Additionally, client side plane 502 includes the user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop-type computer running a web browser for communicating with Service Center 106 via the Internet. Additionally, the user may have one or more phones 114, such as, for example, one or more standard landline telephones and/or wireless phones.

Application service business logic plane 504 may include digital companion server(s) 406, communication portal server(s) 408, and voice portal 412. These entities may communicate between one another using, for example, web services or any other suitable protocols. Web services are a standardized way of integrating web-based applications using the XML, Simple Object Access Protocol ("SOAP"), Web Services Description Language ("WSDL"), and Universal Description, Discovery and Integration ("UDDI") open standards over an Internet Protocol backbone.

As illustrated, digital companion server 406 may provide the following functions: a client proxy 512, a web server 514, an application server 516, a calendar server 518, a notification server 520, and a database 522. Each of these functions may be performed in hardware, software, and/or firmware. Further, these functions may each be executed by a separate server, split across multiple servers, included on the same server functions, or any other manner.

Client proxy 512 may provide a proxy for the digital companion that may be used for security purposes. This client proxy 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 may provide functionality for receiving traffic over data network 102 from a customer. For example, web server 514 may be any standard web server (e.g., Internet Information Server, Apache, etc.) that a customer may access using a web browser program, such as Internet Explorer.

Application server 516 may encompass the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing package shipments and deliveries. For example, permitting a customer to add contacts to their address book from a history of calls made or received by the customer (e.g., using caller ID functions), permitting a customer to make calls directly from their address book, interfacing with a shipping provider's shipping information system, interfacing with a shipping provider's status tracking system, or permitting the customer to look at packages sent and received that are associated with a particular phone number (e.g., the phone number of a current caller). Additionally, these services may include permitting the customer to listen to their voice mail on-line, receive notifications regarding package status and/or calling the sending/receiving party's number, setting up conference sessions on-line, etc. Application server 516 may facilitate more or fewer package shipping and receiving functions as desired.

Additionally, application server 516 may interface with one or more external devices, such as an external web server, for retrieving or sending information. For example, application server 516 may interface with one or more shipping providers' web services to receive data related to package shipping or receiving. Such functionality will be discussed in greater detail below with reference to FIGS. 7-13. In addition, application server 516 may perform other tasks such as interfacing with a voice network's data center 556 (e.g., verizon.com) to determine the services to which the customer subscribes (e.g., call waiting, call forwarding, voice mail, etc.).

Calendar server 518 may provide the capability of scheduling events, logging when certain events occurred, triggering the application functions to perform a function at a particular time, etc.

Notification server 520 may provide the capability to send information from service center 106 to a user terminal 112. For example, notification server 520 at the direction of application server 516 may send a notification to user terminal 112, phone 114, or other location that a package has been received and signed for or that the user is presently receiving a phone call from "User X" at user's phone 114, among other things.

Database 522 may provide for the storage of information usable by the various applications executed by digital companion server(s) 406. These databases may be included in, for example, one or more external storage devices connected to the digital companion server(s) 406. Alternatively, the databases may be included in storage devices within the digital companion servers themselves. The storage devices providing database 522 may be any type of storage device, such as, for example, CD-ROMs, DVDs, flash memory, disk drives, magnetic tape, etc.

As discussed above, communication portal server(s) 408 may provide the hardware and software for managing a customer's account and interfacing with customer account information stored by the provider of customer's voice network 104. As illustrated in FIG. 5, a communication portal server 408 may provide the following functionality: a web server 526, an application server 528, a contacts database 530, and/or a package link database 532. Each of these may be performed by a separate server, split across multiple servers, included on the same server, or any other manner.

Web server 526, as with web server 514 of the digital companion server(s) 406, may provide functionality for receiving traffic over data network 102 from a user. For example, the web server may be a standard web server (e.g., Internet Information Server, Apache, and the like) that a user may access using a web browser, such as Internet Explorer.

Application server 528 may encompass the general functions performed by communication portal servers 408. For example, these functions may include interfacing with the voice network to retrieve and/or modify customer profile information, and creating and editing an address book for the user. Additionally, application server 528 may include the functionality of sending and/or receiving information to/from external servers and/or devices. For example, communication portal servers 408 may be connected to a network, such as, the Internet. Application server 528 may then provide connectivity over the Internet to external servers 552 that provide web services, such as the "superpages.com" website and/or a shipping provider. Application server 528 could then contact these external services 552 to retrieve information, such as an address for a person in the user's address book and/or package status information.

In another example, application server 528 of communication portal 408 may interface a single sign on ("SSO") server 554. SSO 554 may be used to allow users to access all services to which the user subscribes, on the basis of a single authentication that is performed when they initially access the network.

Contacts database 530 may include storage devices for storing an address book for the user. This address book may be any type of address book. For example, the user's address book may include the names, phone numbers, and addresses of people and/or organizations, among other things. Contacts database 530 may also include group addresses identifying members of a particular group (e.g., "Friends"). The storage devices in contacts database 530 may be internal or external to communication portal servers 408 or some combination in between. In addition, these storage devices may be any type of storage device, such as magnetic storage, memory storage, etc.

Package link database 532 may include storage devices for storing information linking package tracking information to identifiers associated with a recipient and a sender of the package, among other things. For example, when a sender is provided a tracking number by a shipping provider (e.g., UPS, FedEx, DHL, etc.), the package tracking number may be linked to sender's phone number(s) and receiver's phone number(s) in package link database 532. This may enable both a sender and a receiver to obtain information about one or more packages based on a phone number or numbers. Package link database 532 may also store additional information associated with a package such as user notes and messages, notification status, and reminders. One will recognize that package tracking numbers may be linked to other identifiers (e.g., social security number, e-mail address, etc.) as desired. Package link database 532 may share storage devices with contacts database 530 or other databases. Alternatively, package link database 532 may be present on a dedicated database server as desired.

Other databases may also be provided within the architecture. For example, a customer profile database (not shown) may be provided. The customer profile data stored in customer profile database may include notification preferences, shipping preferences, and voice services to which the user subscribes, such as, for example, call waiting, voice mail, etc.

Additionally, application services business logic plane 504 of the architecture may include a voice portal 412. As discussed above, voice portal 412 may include, for example, a voice recognition server(s) 416 and an application server(s) 414, and may be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server(s) 414 of voice portal 412 may include hardware and/or software for exchanging information between digital companion server(s) 406 and voice recognition server(s) 416 or between communication portal servers 408 and voice recognition server(s) 416. Additionally, application server(s) 414 may be included on a separate server, included in the hardware and software providing voice recognition server(s) 416, included in digital companion servers 406, etc.

Network access plane 506 of the architecture may include the functions for providing connectivity between application service business logic plane 502 and voice network 104. For example, this plane may include network access servers 410 and/or back end servers 420.

Network access servers 410 may be included in the service center 106 and may provide the hardware and software for sending and receiving information to voice network 104 in processing the applications provided by the service center. For example, network access servers 410 may include a caller ID ("CID") functionality for retrieving caller ID information from voice network 104, a click to dial ("CTD") functionality for instructing an IP in the voice network to place a call via an SSP, and/or a real-time call management ("RTCM") functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a package status notification function. For example, this package status notification function may include the capability to receive notifications of package status, connect to the appropriate shipping provider's service, enter the appropriate codes to retrieve an updated status, and send it to digital companion servers 406.

Additionally, back end server(s) 420 may also include, for example, a directory assistance server. This directory assistance server may, for example, interface service center 106 with a Reverse Directory Assistance Gateway ("RDA Gateway") of voice network 104. An RDA Gateway is a device for issuing requests to a Data Operations Center ("DOC") of voice network 104 for name and/or address information associated with a phone number and receiving the name and/or phone number in response to this request.

In another example, back end server(s) 420 may include a wireless Internet gateway that is used for interfacing with a mobile switching center ("MSC") of a wireless voice network. As with the above-described back end server(s) 420, this wireless Internet gateway may be used for converting requests and information between the formats used by service center 106 and those used by the wireless voice network.

In yet another example, back end server(s) 420 may include a conference blasting server for instructing a conference bridge in voice network 104 to dial out via an SSP to the participants of a voice conference. Or, for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server (not shown). The audio streaming server may, for example, allow a user to connect to it via, for example, the Internet. Additionally, the audio streaming device may buffer or record the signals to permit the user to pause, rewind, and/or fast-forward through the conference.

In yet another example, back end server(s) 420 may include a Single Number Short Message Service ("SN SMS") server for interfacing the service center 106 with a SMS gateway in voice network 104. This may be used, for example, to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP 302, IPs 320, and SSP 308. Additionally, voice network plane 508 may also include the hardware and software included in a wireless carrier's network, such as, for example, the mobile switching center, etc.

For clarity of explanation, system 100 is described herein with reference to the discrete functional elements illustrated in FIGS. 1-5. However, it should be understood that the functionality of these elements and modules may overlap and/or may exist in a fewer or greater number of elements and modules. Elements of system 100 may, depending on the implementation, lack certain illustrated components and/or contain, or be coupled to, additional or varying components not shown. Moreover, all or part of the functionality of the elements illustrated in FIGS. 1-5 may coexist or be distributed among several geographically dispersed locations.

Figure 6:
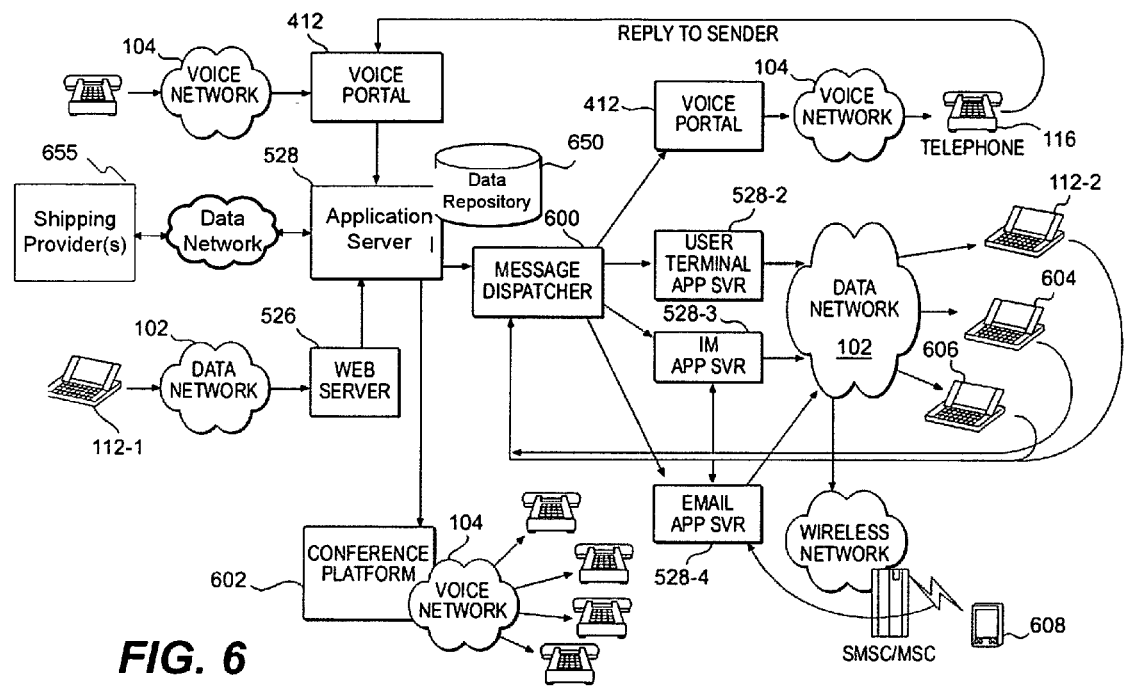
FIG. 6 diagrammatically illustrates an overview of an enhanced shipping and receiving architecture.

FIG. 6 diagrammatically illustrates an overview of an enhanced shipping and receiving architecture. As illustrated, the exemplary enhanced shipping and receiving architecture may include voice portal 412, which is adapted to interface with telephones 114 and 116 via voice network 104; various servers 526, 528, 528-2, 528-3, and 5284, which are adapted to interface with endpoint communication devices, such as user terminal 112-2, via data network 102; data repository 650, representing data management systems (e.g., package link database 532); and a message dispatcher 600, which is adapted to perform various functions. Communication servers may include web server 526, which is adapted to interface with a user terminal 112-1 via data network 102; a application server 528, which is adapted to interface with external services (e.g., web services provided by shipping provider 655), web server 526, and a conference platform 602; a user terminal application server 528-2, an instant messaging application server 528-3 (e.g., a BOT server), and an email application server 528-4, each of which are adapted to interface with corresponding endpoint communication devices, such as user terminal 112-2, an IM device 604, an email device 606, and an SMS device 608, among other things.

Data repository 650, while represented as a single entity in FIG. 6, may include any number of database servers, data storage devices, and other data management tools (e.g., flat file management) consistent with the present disclosure. For example, data repository 650 may represent package link database 532, contacts database 530, database 522, and any other suitable data system. Further, data repository 650 may be used interchangeably with various data management systems (e.g., package link database 532) throughout this disclosure.

Shipping provider(s) 655 may provide an interface for accessing information related to package shipping and receiving. For example, shipping provider(s) 655 may provide web services which allow application server 528 to make a request for package information. The web service associated with shipping provider 655 may provide information (e.g., package tracking numbers, package location, estimated delivery, etc.) via HTTP, HTTPS, or other suitable protocol in response to the request.

While shipping provider(s) 655 is depicted as a single entity in FIG. 6, it is important to note that shipping provider(s) 655 may represent any number of different shipping providers (e.g., UPS, FedEx, DHL, etc.). Further, shipping provider(s) 655 may be referenced in singular and plural form throughout this disclosure indicating the possibility to communicate with one or more shipping providers.

FIGS. 7-13 will now be discussed in the context of exemplary methods for utilizing an enhanced shipping and receiving system. One will recognize that, although the method steps are described in a particular order and with reference to particular figures, the described steps may be carried out in any order utilizing any combination of graphical user interface elements.

Figure 7:
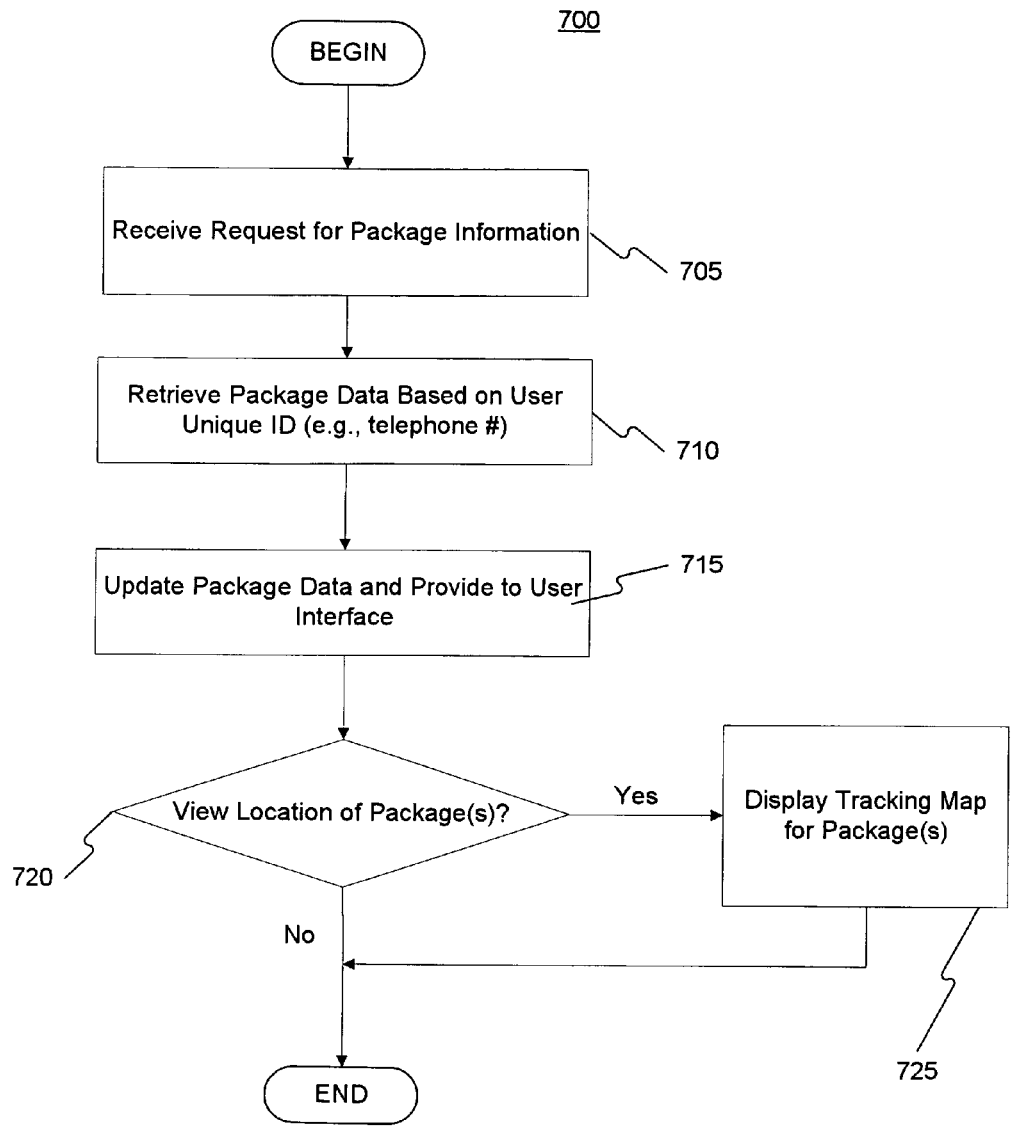
FIG. 7 is a high level flowchart depicting an exemplary method for retrieving and providing enhanced shipping and receiving information consistent with one embodiment of the present disclosure.

FIG. 7 is a high level flowchart 700 depicting an exemplary method for retrieving and providing enhanced shipping and receiving information consistent with one embodiment of the present disclosure. A user may first access functionality associated with an enhanced shipping and receiving system. Such functionality may include, for example, shipping preparation, package tracking, and notifications, among other things. In one embodiment consistent with the present disclosure, a user may receive a telephone call from a person who has sent a package to the user. When the call is received, the user may be automatically prompted with an interface configured to provide functionality associated with an enhanced shipping and receiving system, and/or the user may manually access such an interface. Additional functionality (e.g., shipping preparation, notifications, etc.) will be discussed in greater detail with reference to FIGS. 10-13.

Upon accessing an interface configured to provide functionality associated with an enhanced shipping and receiving system, a request may be received by web server 526, application server 528, or other suitable device for package data related to a user's identifier (step 705). For example, the interface configured to provide functionality associated with an enhanced shipping and receiving system may prepare a request containing the user's telephone number and transmit such a request to web server 526 indicating that package information linked to that phone number should be retrieved.

Once a request for package information has been received, web server 526, application server 528, or other suitable server may retrieve package information from data repository 650 and/or shipping provider 655 (step 710). For example, web server 526, or another suitable server, may process the request creating a database query and/or a SOAP request intended for a web service at shipping provider 655. In such an example, a database query may include a user's identifier, which may be linked to numerous package tracking numbers from numerous shipping providers in package link database 532. Web server 526 may request a list of tracking numbers and the associated shipping providers from package link database 532 and submit the list to appropriate shipping provider(s) 655 web service. The web services may then return responses containing updated package information. The responses may include information helpful to senders and recipients for determining package status. Such information may include, for example, current or last known package location, estimated delivery date, originating location, shipped date, sender of the package, and recipient location (i.e., final delivery point), among other things.

In another embodiment, an update agent on web server 526 (or other suitable server) may cause execution of data updates at some predetermined interval. Such updates may cause automatic retrieval of package information from shipping provider 655. The information may then be inserted to data repository 650 for retrieval by web server 526. For example, an update agent may be configured to request data updates based on intervals determined by a user profile or level of service. Such an interval may indicate that package status should be updated hourly. The update agent may, therefore, request updated information from shipping provider(s) 655 every hour. Package information returned from shipping provider(s) 655 may then be inserted or updated in data repository 650. While the present disclosure describes data retrieval utilizing SOAP requests and web services, one will recognize that other known data retrieval methods (and those developed in the future) may be utilized without departing from the scope of the present disclosure.

Upon receiving a response containing package information, web server 526, application server 528, or other suitable server may provide the package information to the requesting client interface on user terminal 112, or other suitable device (step 715). Numerous methods for displaying the package information may be utilized in a client interface on user terminal 112. For example, a user may view a pop-up window containing shipping information and/or a main window may display the information such that the user may organize the info as desired. Display of such information will be discussed in greater detail with reference to FIGS. 8-13.

Once the package information is displayed, the user may determine whether to view a map or other detailed information (e.g., sender phone number, etc.) associated with the package data (step 720). Where the user elects to view map data or other related data, such information may be provided on user terminal 112 (step 725). Display of such detailed data will be discussed in greater detail with reference to FIG. 9.

Figure 8:
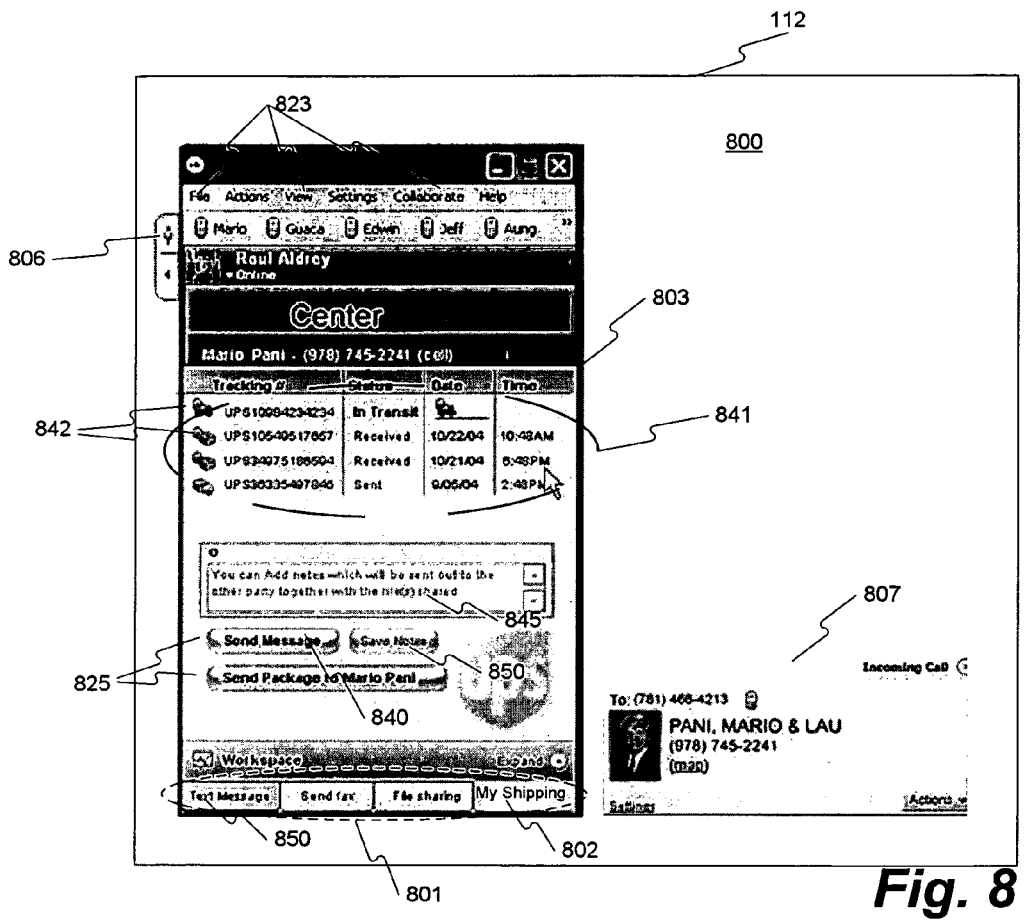
FIG. 8 is an exemplary client interface consistent with one embodiment of the present disclosure.

FIG. 8 is an exemplary client interface 800, which may be useful for implementing the exemplary method described with regard to FIG. 7. Client interface 800 may be configured to provide an interface to an enhanced shipping and receiving system. Client interface may be displayed on user terminal 112, IM device 604, email device 606, or any other suitable device. Client interface 800 may include numerous user interface (UI) elements including, for example, windows, option tabs, pushbuttons, window panes, menu items, and option selectors, among other things. In one embodiment consistent with the present disclosure, client interface 800 may include one or more option tabs 801, main window 803, contacts window 806 (hidden in current view), and pop-up window 807, among other things. One will recognize that client interface 800 may include more or fewer elements as desired. Further, numerous interfaces may be utilized for accessing functionality associated with an enhanced shipping and receiving system and the illustrations and description herein are meant to be exemplary only.

Client interface 800 may be utilized to provide other functionality in addition to enabling functions associated with an enhanced shipping and receiving system. For example, client interface 800 may function as a telephone call manager, a fax manager, an instant message client, a file sharing interface, and a contact management system, among other things. Main window 803 may enable display of the various interfaces associated with client interface 800. For example, in one embodiment, main window 803 may display UI elements consistent with an instant messaging client. Such elements may include contact names/Ids, message notifications, etc. In another embodiment, main window 803 may display elements consistent with a telephone call manager. In such an embodiment elements may include a caller ID information pane, a call history pane, and a contact window, among other things. Client interface may enable display of numerous other interfaces without departing from the scope of the present disclosure.

Option tabs 801 may enable selection of one or more interfaces associated with client interface 800. For example, a user wishing to view a text messaging interface may select text message option tab 850 within option tabs 801. Upon selection of text message option tab 850, UI elements associated with a text message interface may be displayed within main window 803. Option tabs 801 may also be used to select an interface associated with an enhanced shipping and receiving application. For example, a user operating in text messaging interface of client interface 800 may wish to prepare a package for shipment. The user may click, or otherwise actuate, shipping option tab 802, thereby causing UI elements associated with the enhanced shipping and receiving interface to be displayed within main window 803. Other methods for accessing interfaces associated with an enhanced shipping and receiving system will be discussed in greater detail below (e.g., automatic access based on incoming call).

It is important to note that although option tabs are used for interface selection in this discussion, numerous other methods of interface selection may be utilized. For example, interfaces may be selected using elements including, menu options 823, push buttons 825, and radio buttons (not shown), among other things. Use of such elements may be determined based on a desired "look and feel" of client interface 800 and/or other suitable factors. Alternatively, some systems may be configured to allow for voice selection of particular elements (e.g., systems configured for voice recognition). In such an embodiment it may be possible for a user to make a selection using voice commands.

Shipping and receiving system may be accessed automatically by a user terminal 112. Because user terminal 112 may be communicatively connected to voice portal 412 via digital companion server 406, terminal 112 may receive incoming and outgoing call information (e.g., caller ID). Therefore, upon receiving a telephone call from a package sender (i.e., a user with packages in transit to a receiver), a receiver's user terminal 112 may recognize sender's phone number and automatically access enhanced shipping and receiving system. For example, a telephone call may be received causing pop-up window 807 to appear on user terminal 112. Pop-up window 807 may display information such as caller telephone number, caller name, a photo of the caller, and options associated with pop-up window 807, among other things. In addition to pop-up window 807, main window 803 may automatically display an interface consistent with an enhanced shipping and receiving system.

In one embodiment consistent with the present disclosure, upon receiving a telephone call from a sender of packages, shipping tab 802 within option tab selectors 801 may be automatically selected within a receiver's client interface 800 on terminal 112. This may then cause the display of package status list 841 within main window 803 or other suitable location. Package status list 841 may include pending package tracking numbers 842, package status summaries, time/date information, and other relevant information (e.g., shipping provider associated with a package). Packages of particular relevance (e.g., those associated with a calling sender) may be highlighted (e.g., flashing, different color, etc.) or, alternatively may be the only packages shown within main window 803. Further, contents of package status list 841 may be customizable by a user and, therefore, more or less information may be shown as desired.

In another embodiment, upon receiving a call, a user may see pop-up window 807 on user terminal 112 and manually select shipping tab 802 within option tab selectors 801. Upon selecting shipping tab 802, the user may be presented with an interface similar to that described, or, where a caller has no packages in transit to user, no package information may be displayed. Where no packages are displayed and the caller is not an existing contact (i.e., not in the user's address book), the user may elect to add the caller to his address book and/or contact list. Additionally, the user may select an option enabling a new package record to be created for the caller. For example, a caller may request that a courtesy package be sent out. The user receiving the call may initiate a new package shipping request based on caller ID information of the caller. Creation of shipping requests will be discussed in greater detail with reference to FIGS. 10-13.

Each entry in package status list 841 may enable access to additional detailed package information. For example, a user may click, right-click, double-click, or otherwise actuate an entry in package status list to cause information specific to the selected package. In such an embodiment, information may be displayed in a pop-up window similar to pop-up window 807 and/or within main window 803. Detailed package information will be discussed in greater detail with reference to FIG. 9.

In addition to viewing information, a user may perform operations associated with each package record. For example, package note box 845 may allow a user to enter, review, and/or send one or more notes associated with a particular package. After entry of a note into package note box 845, a user may actuate a send button 840 to send a note to the sender or recipient, and/or a save button 850 to save a note to data repository 650. The notes displayed may be dependent on the selected package identifier 842, or alternatively, all notes may be shown for all packages as desired.

Figure 9:
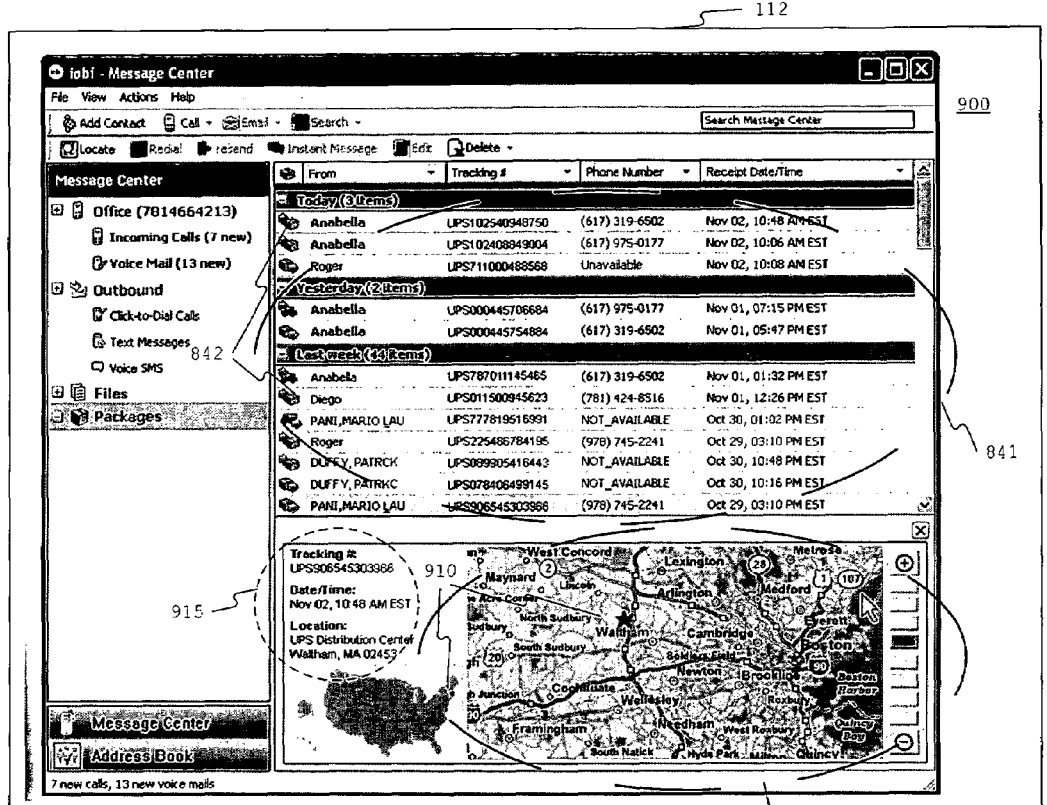
FIG. 9 is an exemplary illustration of a package mapping interface related to package tracking.

FIG. 9 is an exemplary illustration of a package mapping interface 900 related to package tracking. In such an embodiment, a user may view a geographic representation (e.g., a map) including indicators for one or more package locations relative to features of the geographic representation. Such package indicators may be determined based on a unique user ID (e.g., phone number). Mapping interface 900 may include a map 905, package identifier list 841, and detailed information section 915, among other things. Package identifiers 842 listed in package identifier list 841 may enable a user to locate one or more packages within a geographic area. For example, upon selecting one or more package identifiers 842 from package identifier list 841, a user may be presented with one or more maps 905 and detailed information section 915. Map 905 may include package indicators 910 indicating geographic positions of the selected packages within a particular area. Map 905 may allow a user to "zoom in" and "zoom out" to better understand where the selected packages are located. Map 905 may provide additional functionality such as scrolling, directional information, and other mapping type functionality. For example, where a package is still en route to a recipient, map 905 may display where the package was last scanned as well as display traffic information related to the last scanned location and the package destination. Traffic information may include real-time traffic feeds (e.g., accident locations, traffic tie-ups, construction zones, traffic volume, and the like), global positioning system (GPS) information associated with a delivery truck, and other suitable information.

Detailed information section 915 may provide a text representation of status information related to one or more packages selected by a user. For example, package tracking number, shipping date, and current location may be displayed within detailed information section 915. More or less information may be displayed in detailed information section 915 without departing from the scope of the present disclosure.

In one embodiment, a user may manually access such a system (e.g., clicking on an option tab to bring up a shipping interface). In addition to receiving a call, a sender of packages may also utilize a client interface associated with an enhanced shipping and receiving system to place a call to a receiver of packages. For example, a sender may receive a notification from shipping provider(s) 655 indicating that a package has been delivered to a receiver (notifications will be discussed in greater detail with reference to FIG. 13 below). Upon receiving such a notification, sender's user terminal 112 may display an interface associated with an enhanced shipping and receiving system. Such an interface may allow the sender to see a contact (i.e., the receiver) associated with the received package and initiate a phone call to the receiver, among other things. One will recognize that numerous other permutations may be implemented with departing from the scope of the present disclosure.

Figure 10:
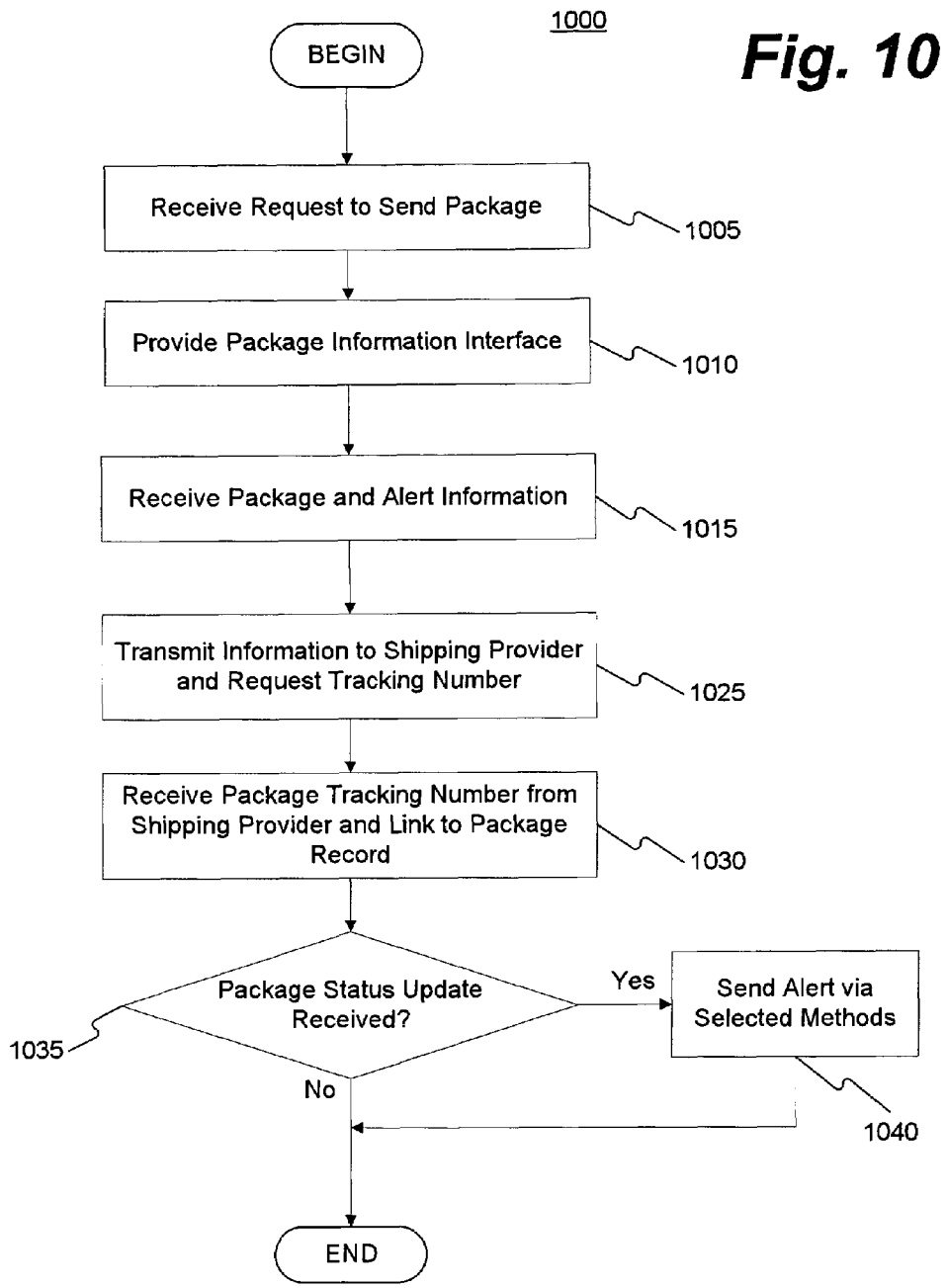
FIG. 10 is a flowchart illustrating another exemplary method for providing enhanced shipping and receiving services consistent with the present disclosure.

FIG. 10 is a flowchart 1000 illustrating another exemplary method for providing enhanced shipping and receiving services consistent with the present disclosure. A request may be received by web server 526, application server 528, or other suitable device from a user indicating a desire to send a package using an enhanced shipping and receiving system (step 1005). Such a request may be generated following a user's selection of a contact who should receive the package. A user may select a contact by dragging and dropping a contact name onto an area labeled to indicate that a package shipping record should be created. Alternatively, a user may actuate a button or other appropriate UI element within client interface 800 to indicate a selection or to manually enter a new contact.

Upon receiving a selection, the user may be provided a package information interface on user terminal 112 (step 1010). Such an interface may be substantially similar to the interface described with reference to FIG. 12, or may differ in varying aspects. As noted above, more or less information may be present within such an interface based on such factors as shipping provider requirements, user preferences, etc.

Information related to the package (e.g., recipient information, notification preferences, and the like) may then be received (e.g., by web server 526 and/or application server 528) from the user (step 1015). Such information may be provided from contacts database 530, manual user entry, an address service (e.g., "superpages.com"), or other suitable method. For example, a user may drag a contact from a contacts window onto a selector configured to indicate selection of a contact. Contact information from contacts database 530 related to the dragged contact may then be retrieved. In addition to dragging and dropping, a user may select notification preferences for each package created. For example, a user may wish to receive package status updates for a particular package by cell phone. The user may indicate such a preference when creating a new package. Indication of such preferences will be discussed in greater detail with reference to FIG. 13.

Upon receiving information related to a new package, a new package record may be created and information transmitted to a shipping provider with a request for a tracking number (e.g., in a SOAP request) (step 1025). A new package record may be created at package link database 532, shipping provider 655, and/or any other suitable location. The package may be linked within package link database 532 to a identifier associated with the sender and a identifier associated with the recipient. The identifier may include a telephone number, an e-mail address, or any other identifier. Additional package information may also be stored in package link database 532 (e.g., creation date, package weight, shipping provider chosen, etc.).

A response including a unique package tracking number and/or other information may then be received from the shipping provider (e.g., in a SOAP response) (step 1030). This response may be received by web server 526, application server 528, or other suitable device. The response may be parsed and the tracking number may extracted and linked to the package record in package link database 532.

Web server 526, application server 528, or other suitable device may determine or request package status updates based on tracking numbers received (step 1035). In one embodiment, shipping provider 655 may transmit information including a tracking number and package status (e.g., package delivered) to application server 528. Application server 528 may determine that the information contains package status information and may locate the package record in package link database 532. Application server 528 may then retrieve the unique identifier for the package sender and package recipient and send notifications according to the selected notification methods to the associated parties and/or update status in data repository 650 (step 1040). For example, a package status message indicating delivery of a package with a unique tracking number may be received. Application server 528 may then determine the preferred methods of notification based on the provided tracking numbers (e.g., phone and e-mail) and retrieve the required contact information (e.g., phone number for the sender and e-mail for the recipient) from package link database 532. Application server 528 may then cause notification server 520 to send a notification to the appropriate device (e.g., sender's phone and recipient's user terminal 112) (step 1040). Alternatively, application server 528 or other suitable device may request updated package status from shipping provider 655 at predetermined intervals and cause notifications to be generated as desired.

Figure 11:
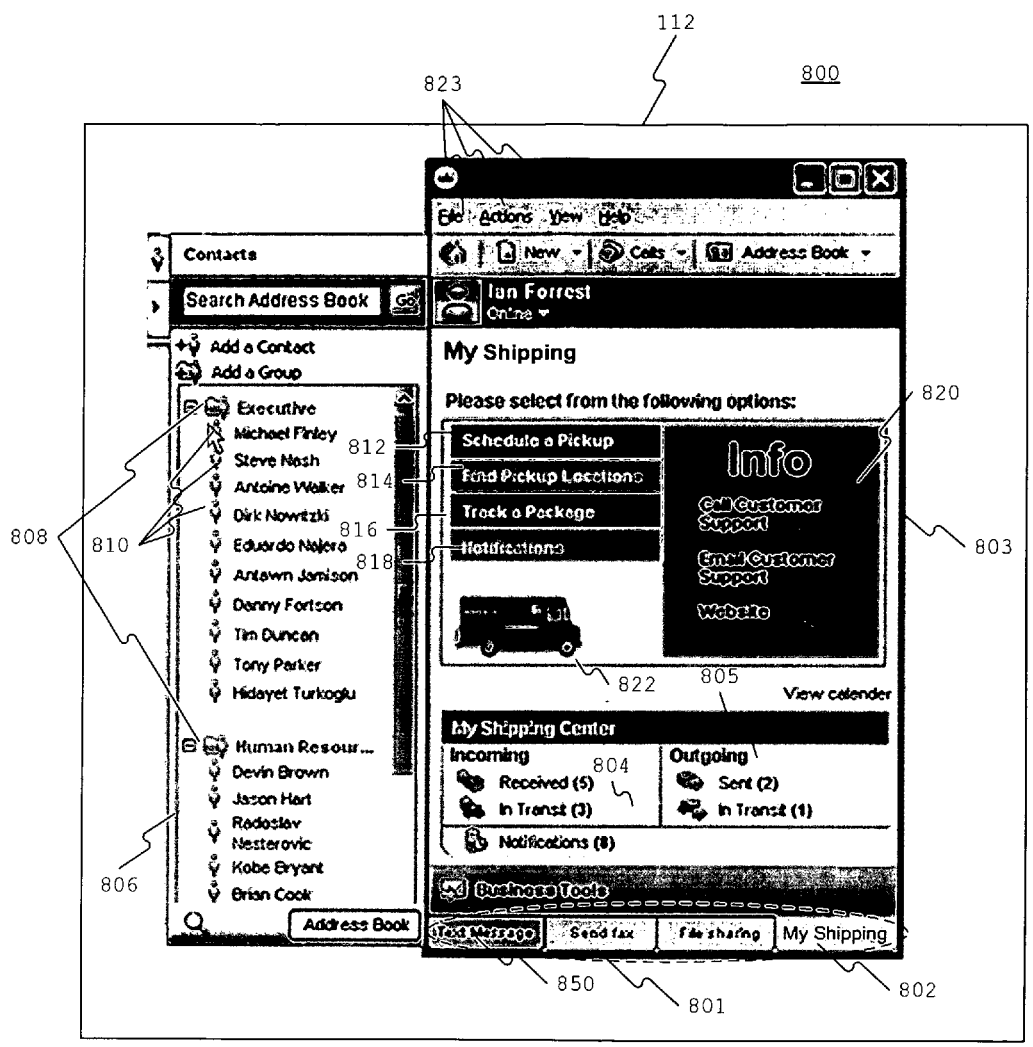
FIG. 11 is an exemplary illustration of the client interface according to another embodiment consistent with the present disclosure.

FIG. 11 is an exemplary illustration of client interface 800 according to another embodiment consistent with the present disclosure. A user may manually select shipping option tab 802, or other suitable selector, to access an enhanced shipping and receiving system. Upon manually selecting shipping option tab 802, a user may be presented with UI elements associated with an enhanced shipping and receiving system. Elements associated with an enhanced shipping and receiving system may include, for example, incoming status pane 804, outgoing status pane 805, option selectors 812-818, informational display pane 820, and shipping provider selector/indicator 822. One will recognize that client interface 800 is exemplary only and may be displayed differently and with different functionality based on such factors as selected shipping provider, level of service with respect to enhanced shipping and receiving, and other related factors.

Incoming status pane 804 may display a status summary (e.g., number of incoming packages received) with respect to incoming packages linked to a user's unique ID (e.g., phone number) in package link database 532. Outgoing status pain

805 may display a status summary (e.g., number of outgoing packages sent) with respect to packages sent by a user based on the user's unique ID. Client interface 800 may request such package data upon accessing the enhanced shipping and receiving system using methods similar to those discussed above with reference to FIGS. 7-9. For example, a user may see, among other things, that there are currently 3 packages in transit to the user and 1 package is in transit having been sent by the user. The user may select text or option selectors associated with these or other indicators to view additional information related to the packages. Information displayed may be consistent with other package information described in the present disclosure.

Option selectors 812-818 may enable a user to select specific functions associated with an enhanced shipping and receiving system. Selection of an option selector may be performed by clicking, double-clicking, dragging and dropping, and/or right-clicking with a mouse or other input device (e.g., joystick). Where a user terminal 112 is configured for voice recognition, selection of an option selector may be accomplished by speaking the text present on the option selector (e.g., saying "schedule a pickup"). For example, selecting create new package selector 812 may present functionality enabling a user to create a shipping record for a package to be sent. Selecting location option selector 814 may display functionality to assist a user in locating a package pickup location for a particular shipping provider. Tracking option selector 816 may cause an interface similar to that shown in FIG. 9 to be displayed such that a user may track packages sent or to be received. Notification option selector 818 may display notifications (e.g., package delivered, package sent, etc.) related to packages associated with a user's unique ID.

Contacts window 806 may display a listing of contacts 810 present in a user's address book in contacts database 530. Contacts 810 in contact window 806 may be organized into contact groups 808 and displayed as desired by a user. Contacts window 806 may display various information associated with contacts 810 including, for example, contact ID, contact address, last contact date, etc. Alternatively, a contact nickname or ID may be displayed and additional information may be viewed by selecting a contact 810. In addition contacts may be added, edited, and/or deleted utilizing functionality within contacts window 806 or other suitable interface.

Contacts 810 within contacts window 806 may be selected and/or "dragged and dropped" to "select" an option selector or otherwise access functionality related to an enhanced shipping and receiving system. Such functionality may include, for example, preparing a new shipping request for a package, editing a shipping request, checking notifications, and checking package status based on a contact, among other things. In one example, a user may drag a contact 810 (e.g., by clicking a contact with a mouse and dragging the contact) onto tracking option selector 816. Upon releasing the contact 810 onto tracking option selector 816, a package tracking interface may be displayed containing information related to packages associated with contact 810 and the user (e.g., packages sent by user to contact 810 and vice versa). A tracking interface may be similar to that described with regards to FIGS. 8 and 9, or a separate interface may be displayed as desired. In another example consistent with the present disclosure, a user may drag a contact 810 onto create new package selector 812, or other suitable selector. This action may initiate creation of a new shipping request allowing a user to create a package record for a package to be sent to contact 810. A user may also select create new package selector 812 using another method (e.g., clicking with a mouse) to create a new package record.

Shipping provider selector/indicator 822 may allow a user to select which shipping provider to use. A user may have access to multiple shipping provider(s) 655 (e.g., UPS, FedEx, DHL, etc.) based on contracts, accounts, or other agreements with the various shipping provider(s) 655. A user may consider factors such as, rates, delivery locations, speed of delivery, and the like when making a determination as to which shipping provider 655 to use for any particular package. For example, application server 528 may provide functionality for comparing shipping rates between shipping providers based on weight and shipping address. A user may view such rate information within client interface 800 so that a determination of which shipping provider to use may be made. Upon selecting shipping provider selector/indicator 822, a user may be presented with a list of shipping provider options (e.g., via a pop-up, drop-down, or other suitable UI element). The user may then make a selection of shipping providers and client interface 800 may respond accordingly (e.g., change of colors, UI elements, etc.).

Figure 12:
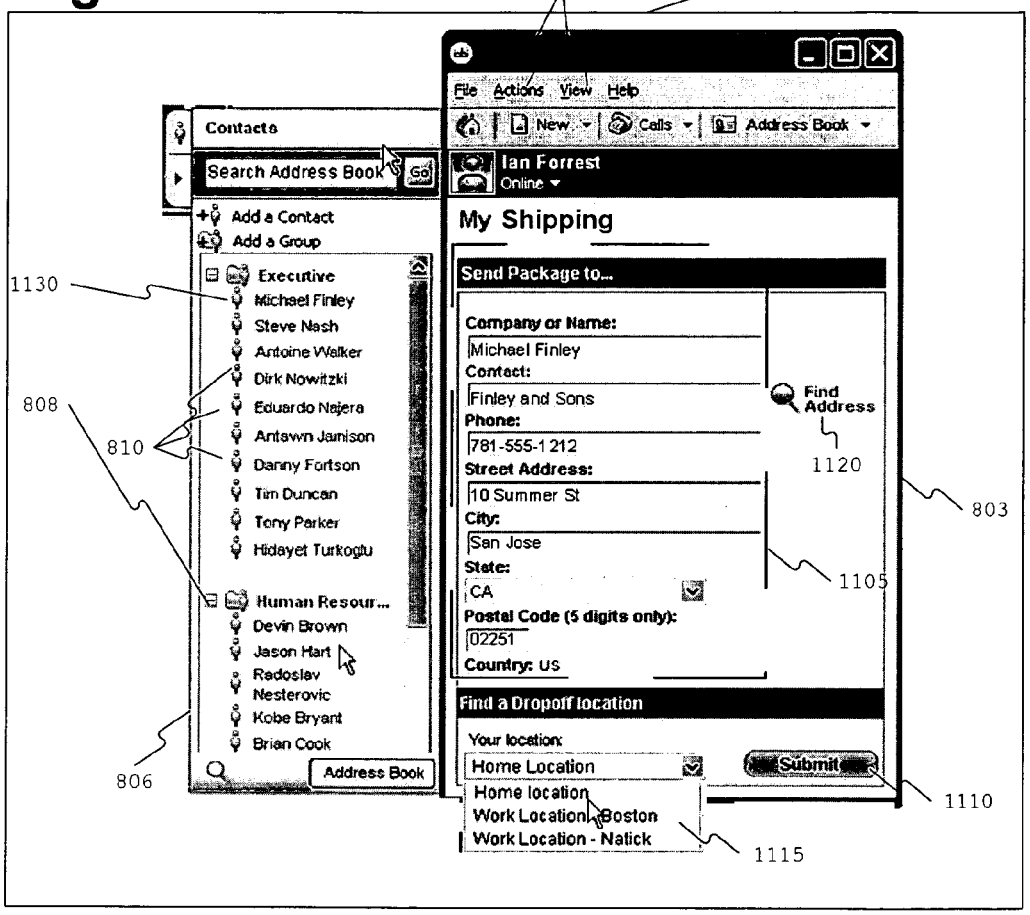
FIG. 12 is an exemplary illustration of a client interface following selection of a create new package selector consistent with one embodiment of the present disclosure.

FIG. 12 is an exemplary illustration of a client interface 800 following selection of create new package selector 812 consistent with one embodiment of the present disclosure. Upon selecting create new package selector 812 (e.g., dragging and dropping a contact, clicking, speaking the option, etc.) client interface 800 may display UI elements enabling a user to enter and/or review information related to a package recipient. Displayed UI elements may include, for example, contact information 1105, submit package button 1110, sender location selector 1115, and address locator 1120. Contact information 1105 may include numerous data fields that may be represented by text boxes, labels, dropdown selectors, etc. to enable display of information related to a contact. Such information may include contact name, full name, telephone number, and preferred shipping address, among other things. The information included may vary based on the chosen shipping provider's desired format, as may the display order and layout.

In one embodiment, a user may drag a contact 810 on to create new package selector 812. In such an embodiment, UI elements associated with the contact data fields may be populated automatically based on information associated with contact 810 in contacts database 530. For example, contact 1130 "Michael Finley" may be dragged onto create new package selector 812. Upon display of contact information 1105, shipping information associated with contact 1130 may be automatically populated as shown in FIG. 12. The user may then edit and save such information as desired, or leave the information as displayed.

Alternatively, a user may manually enter information related to a contact. The user may type or otherwise select data for each contact data field within contact information 1105. In such an embodiment, following entry of the information, the user may save the entered information as a new contact for later use, discard the information, or edit the information as desired.

Where a user does not have address information for a package recipient (e.g., no address book entry), the user may utilize address locator 1120. Utilization of address locator 1120 may allow a user to connect to an address service (e.g., "Superpages.com") via application server 528 or other suitable device. This may assist a user in locating address information related to a potential package recipient. For example, a user seeking an address for a package recipient may connect to "Superpages.com" and search for the recipient's address based on, for example, name, state, and telephone number. Upon locating the address information, such information may be automatically populated into data field of contact information 1105. Further, the data may be saved as a new contact or discarded as desired by the user.

Following entry of contact information for a new package, a user may actuate submit package button 1110. Actuation of submit package button 1110 may be accomplished via clicking, voice command, or other suitable method. Such actuation may cause a new package record to be created at data repository 650, shipping provider 655, and/or other suitable location.

In some embodiments, additional package information may be entered prior to creating a new package record, including, for example, package weight, package dimensions, package contents, insurance value, and other information requested by a shipping provider. For example, upon actuating submit package button 1110, a user may be prompted to enter an estimated weight and package dimensions for the package to be sent. Upon entering such information, the user may again actuate submit package button 1110 to proceed with package preparation. In other embodiments, such information may be entered by shipping provider upon receipt of the package to be sent.

Once a package record has been created, the user may provide the package to shipping provider 655. While not shown in the figures, a user may select a method for providing the package to the shipping provider using client interface 800. Such a selection may be made via dropdown selector, radio button selector, or other suitable selector. Options for such a selector may include "pickup," drop-off," "package drop-box," etc. Pickup option may cause a driver from a shipping provider to come to the user to retrieve the package, while drop-off option may indicate that the user will take the package to a shipping provider (or affiliate) facility. Package drop-box option may indicate that the package will be placed in an un-staffed package drop-box common in and around office and other buildings. One will recognize that numerous other options may be used without departing from the scope of the present disclosure.

Figure 13:
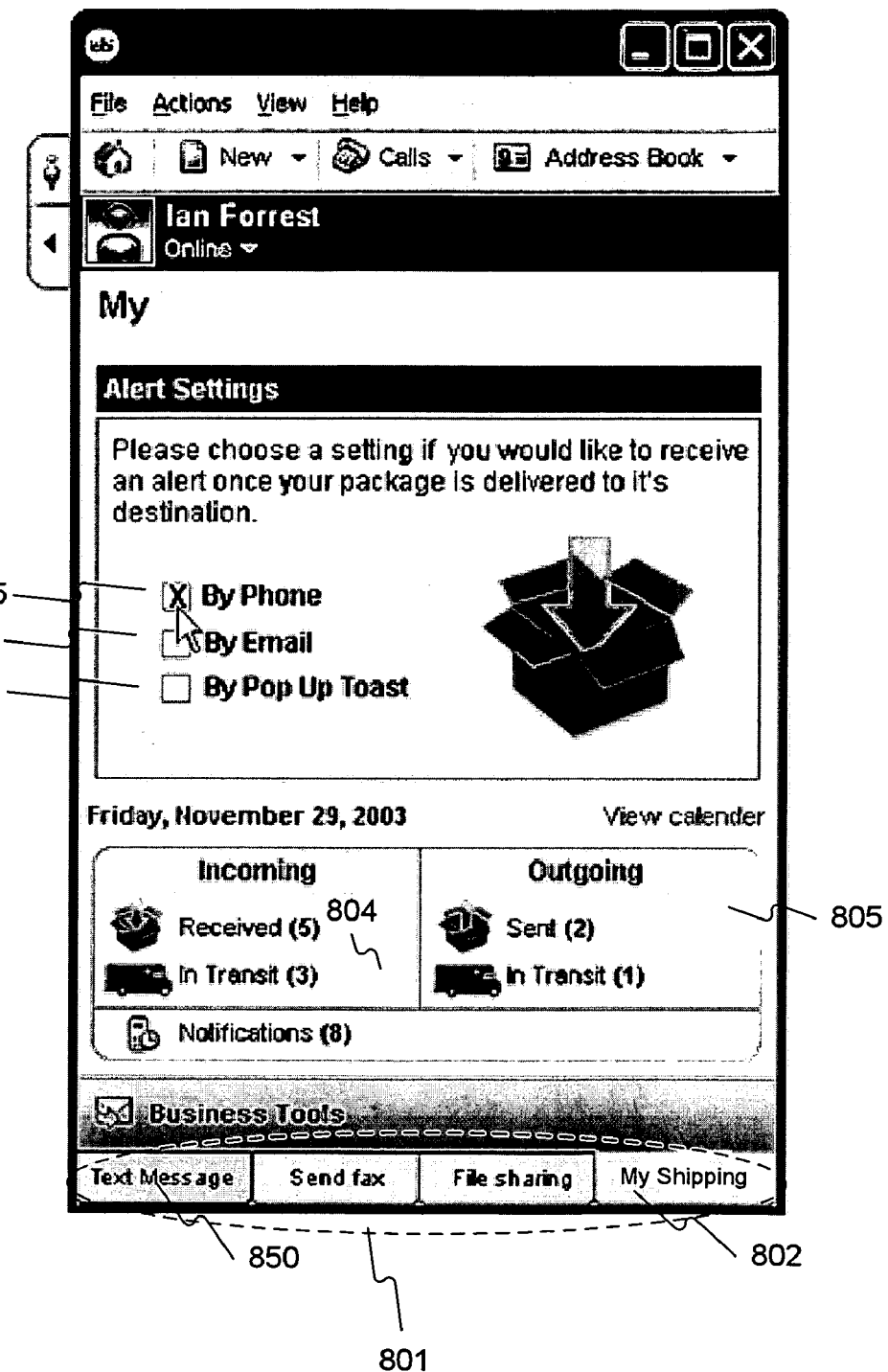
FIG. 13 is an illustration of a notification selection interface consistent with the present disclosure.

FIG. 13 is an illustration of a notification selection interface consistent with the present disclosure. Notification selection interface may include, for example, notification selection checkboxes 1205-1215. While FIG. 13 depicts notification selectors as checkboxes, any UI element may be used for enabling selection of notifications.

Notifications may be sent to update a sender or receiver regarding package status and may include any notification indicative of such status. Notifications may be sent by notification server 520, application server 528, web server 526, or any other device. Such notifications may be configurable and may be received by numerous devices and in numerous forms. For example, a notification may include an e-mail sent to user terminal 112 or an e-mail device (e.g., a Blackberry), a voice message sent to telephone 114, a voice e-mail sent to user terminal 112, a pop-up window sent to user terminal 112, or any other suitable known method for providing a notification.

Notifications may be configured to be sent to a single device or multiple devices. For example a user may determine that only phone notifications should be received. Therefore, such a user may configure personal preferences for notifications by checking only phone notification checkbox 1205. Alternatively, a user may wish to receive notifications via all available devices and interfaces, and in a particular order. Such a user may select all notification selection checkboxes 1205-1215 (and any additional notification checkboxes that may be present), thereby causing notifications to be sent to all devices and interfaces. In such an embodiment a user may have preferences indicating the order in which the devices and interfaces should be notified. For example, a user may configure notifications such that the first notification is sent to a telephone, if no answer, a notification is sent to a cell phone, and so on. One will recognize that various users may have various preferences and therefore, numerous permutations may be utilized.

Further, notification configuration may be set on a package by package basis or based on selected user preferences. For example, a user sending an important package may configure notifications to be sent to all available devices for that package, but other packages should only generate notifications sent to an e-mail address. One will recognize that the discussed scenario is exemplary only and numerous other scenarios may be possible.

Utilizing systems and methods of the present disclosure may allow users to easily send, track, and receive packages without the need to memorize cumbersome tracking numbers. By linking package tracking numbers for any shipping provider to a identifier such as a phone number, a user may easily access information related to many packages without ever knowing the tracking number. Further, such linking enables flexibility for notifying users regarding the status of their packages.

In addition, integration of the shipping and receiving interfaces with user terminals and telephones increases convenience for a user. A user need only enter an address one time and save the information to a contact list and/or address book to be used as many times as needed in the future. Moreover, the ability to drag and drop a contact out of the contact list and/or address book and auto-populate shipping provider specific information further eases the task of preparing a package record prior to shipment. Such integration further allows user to easily contact one another upon receipt of a notification or to view package information upon receipt of a telephone call.

The order in which steps and processes consistent with the preferred embodiment described herein is exemplary only. It will be apparent that order of performance may not be important and the steps and processes may be performed in an order different than that described.

Other embodiments of the disclosure will be apparent from consideration of the specification and practice of the preferred embodiment disclosed herein. It is intended that the specification and examples be considered as exemplary only, with a true scope of the disclosure being indicated by the following claims.

We claim:

1. A computer-implemented method comprising steps, performed by one or more processors, of:
   receiving, from a sender, a selection of a contact related to a shipping request to ship a package, wherein:
      the contact is associated with a contact identifier comprising a telephone number of the contact; and
      the sender is associated with a sender identifier comprising a telephone number of the sender;
   identifying package shipping data associated with the contact;
   providing the shipping request, including the package shipping data, to a shipping provider;
   receiving a package identifier related to the shipping request from the shipping provider;
   associating the package identifier with the sender identifier and the contact identifier;
   obtaining first notification information corresponding to the sender identifier and second notification information corresponding to the contact identifier, wherein:

the first notification information identifies a first communications device of the sender and a first mode of communications associated with the first communications device; and the second notification information identifies a second communications device of the contact and a second mode of communications associated with the second communications device; and providing a status of the package to the first communications device in accordance with the first communications mode and to the second communications device in accordance with the second communications mode, the providing comprising:

retrieving the status of the package based on at least the telephone number of the contact; and providing a geographic representation to the first and second communications devices, the geographic representation comprising an indication of a current location of the package relative to features of the geographic representation, wherein:

the providing further comprises at least one of providing the status via a notification generated at a predetermined interval, or providing the status in response to a status request from the sender or the contact; and the notification further prompts the sender or the contact, whomever did not make said status request, to establish communications between the first and second communication devices.

2. The method of claim 1, wherein the contact is selected using a computer based graphical user interface.

3. The method of claim 1, wherein the contact is selected by dragging and dropping a contact name from a contact list.

4. The method of claim 1, wherein the package shipping data is stored in a computer based address book associated with the sender.

5. The method of claim 1, wherein the status of the package includes at least one of a package delivered indicator, a current package location, an estimated package delivery date, or a package origination location.

6. The method of claim 1, wherein the sender identifier and the contact identifier further comprise at least one of an e-mail address or an instant messaging client ID.

7. The method of claim 1, wherein the notification includes at least one of a telephone call, an instant text message, or an e-mail.

8. The method of claim 7, wherein a priority may be assigned to the notification.

9. The method of claim 1, wherein the package shipping data includes at least one of a shipping address, a method for providing the package to the shipping provider, a package weight, or a notification preference.

10. The method of claim 1, wherein the package identifier includes a package tracking number.

11. A system, comprising:

an interface configured to receive a selection of a contact for a request to ship a package from a sender, wherein:

the contact is associated with a contact identifier comprising a telephone number of the contact; and the sender is associated with a sender identifier comprising a telephone number of the sender;

an identifying component coupled to the interface and configured to receive an indication of the selection of the contact and to identify package shipping data associated with the contact;

a providing component coupled to the identifying component and configured to provide the shipping request, including the package shipping data, to a shipping provider;

a receiving component configured to receive a package identifier associated with the shipping request from the shipping provider;

a data repository coupled to the receiving component and configured to store the package identifier and associate the package identifier to a sender identifier and the contact identifier;

a component configured to obtain first notification information corresponding to the sender identifier and second notification information corresponding to the contact identifier, wherein:

the first notification information identifies a first communications device of the sender and a first mode of communications associated with the first communications device; and the second notification information identifies a second communications device of the contact and a second mode of communications associated with the second communications device; and a notification component coupled to the data repository and configured to provide a package status notification to the first communications device in accordance with the first communications mode and to the second communications device in accordance with the second communications mode, wherein the notification component is further configured to:

retrieve, from the data repository, a status of the package based on at least the telephone number of the contact; and provide a geographic representation to the first and second communications devices, the geographic representation comprising an indication of a current location of the package relative to features of the geographic representation, wherein:

the notification component is further configured to at least one of provide the status via a notification generated at a predetermined interval, or provide the status in response to a status request from the sender or the contact; and the notification further prompts the sender or the contact, whomever did not make said status request, to establish communications between the first and second communication devices.

12. A non-transitory computer-readable storage module storing instructions that, when executed by a processor, cause the processor to perform a method comprising the steps of:

receiving, from a sender, a selection of a contact related to a shipping request to ship a package, wherein:

the contact is associated with a contact identifier comprising a telephone number of the contact; and the sender is associated with a sender identifier comprising a telephone number of the sender;

identifying package shipping data associated with the contact;

providing the shipping request, including the package shipping data, to a shipping provider;

receiving a package identifier related to the shipping request from the shipping provider;

associating the package identifier with the sender identifier and the contact identifier;

obtaining first notification information corresponding to the sender identifier and second notification information corresponding to the contact identifier, wherein:
- the first notification information identifies a first communications device of the sender and a first mode of communications associated with the first communications device; and
- the second notification information identifies a second communications device of the contact and a second mode of communications associated with the second communications device; and providing a status of the package to the first communications device in accordance with the first communications mode and to the second communications device in accordance with the second communications mode, the providing comprising:
- retrieving the status of the package based on at least the telephone number of the contact; and
- providing a geographic representation to the first and second communications devices, the geographic representation comprising an indication of a current location of the package relative to features of the geographic representation, wherein:
- the providing further comprises at least one of providing the status via a notification generated at a predetermined interval, or providing the status in response to a status request from the sender or the contact; and
- the notification further prompts the sender or the contact, whomever did not make said status request, to establish communications between the first and second communication devices.

* * * * *